(12) United States Patent
Yu et al.

(10) Patent No.: US 7,237,260 B2
(45) Date of Patent: Jun. 26, 2007

(54) METHOD FOR DYNAMIC SELECTION FOR SECURE AND FIREWALL FRIENDLY COMMUNICATION PROTOCOLS BETWEEN MULTIPLE DISTRIBUTED MODULES

(75) Inventors: Juan Yu, Cranberry, NJ (US); Hasan Timucin Ozdemir, Plainsboro, NJ (US); Kuo Chu Lee, Princeton Junction, NJ (US); Shiwen Chen, Marlboro, NJ (US); Eimei Nanma, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 10/614,909

(22) Filed: Jul. 8, 2003

(65) Prior Publication Data

US 2005/0010816 A1    Jan. 13, 2005

(51) Int. Cl.
*H04L 29/00* (2006.01)
*H04L 29/06* (2006.01)

(52) U.S. Cl. ............... 726/11; 726/3; 726/15; 726/13; 709/229; 709/249; 370/392; 370/338; 370/351; 713/153

(58) Field of Classification Search ............... 380/268, 380/38; 370/203, 209
See application file for complete search history.

(56) References Cited

U.S. PATENT DOCUMENTS

| | | | | |
|---|---|---|---|---|
| 5,805,803 A | * | 9/1998 | Birrell et al. ............... 713/201 |
| 6,055,236 A | * | 4/2000 | Nessett et al. ............... 370/389 |
| 6,182,141 B1 | * | 1/2001 | Blum et al. ................. 709/227 |
| 6,832,322 B1 | * | 12/2004 | Boden et al. ................. 726/15 |
| 6,963,982 B1 | * | 11/2005 | Brustoloni et al. ........... 726/15 |
| 6,992,037 B2 | * | 1/2006 | Chen et al. ................. 502/182 |
| 6,993,037 B2 | * | 1/2006 | Boden et al. ............... 370/401 |
| 2004/0133690 A1 | * | 7/2004 | Chauffour et al. .......... 709/229 |

OTHER PUBLICATIONS

Western Schools Cape Network. TCP/IP Services. Jul. 4, 1997 http://www.wcape.school.za/handbook/tcpip2.htm#Proxy_servers.*
Mei et al. "Turning an HTTP Proxy Server into a Wireless Internet Gateway" Fu Jen Catholic University. Taiwan. 2000. http://www.isoc.org/inet2000/cdproceedings/3b/3b_1.htm.*
"Implementing a distributed firewall"□□http://delivery.acm.org/10.1145/360000/353052/p190-ioannidis.pdf?key1=353052&key2=4374714711&coll=GUIDE&dl=portal,ACM&CFID=13882002&CFTOKEN=22502295.*

* cited by examiner

*Primary Examiner*—Syed A. Zia
(74) *Attorney, Agent, or Firm*—Harness, Dickey & Pierce, PLC (57) ABSTRACT

Distributed modules in a network dynamically select communication protocols to communicate in a secure or firewall-protected network. Applications register with a lookup service. The lookup service maintains a lookup table including registration information for multiple applications. Registration information may include, but is not limited to, IP address, firewall restrictions, tunnel protocol, port information, and proxy queue capabilities. An application seeking to communicate acquires the registration information for a desired recipient from the lookup table. The application uses the registration information to select communication protocols necessary to communicate with the recipient.

42 Claims, 6 Drawing Sheets

METHOD FOR DYNAMIC SELECTION FOR SECURE AND FIREWALL FRIENDLY COMMUNICATION PROTOCOLS BETWEEN MULTIPLE DISTRIBUTED MODULES

FIELD OF THE INVENTION

The present invention relates to communication protocols in a network, and more particularly to tunneling in a network using different communication protocols.

BACKGROUND OF THE INVENTION

Clients connected to a network often use a firewall for security purposes. The firewall controls incoming and outgoing communication in the network to protect resources of the network. In most applications, the firewall protects a private network from public access. Typically, the firewall is located at an entry point of the network and evaluates whether a particular communication user should be permitted access to the network.

The network may intend that certain outside users are able to access the network. These users may be authorized to access applications and data that are internal to the network. The network may implement a virtual private network (VPN) or a proxy server to provide access to the authorized users. If the network uses a proxy server to provide access, the proxy server must be tightly integrated with the network. The network cannot provide services without managing installation and configuration of the proxy server.

Additionally, the network may use tunneling to provide access to the authorized users. Tunneling refers to encapsulating information, such as a data packet, in a different communication protocol. The firewall may be restricted to a certain type of protocol. Tunneling allows a data packet from an outside source to be encapsulated in a protocol that is accepted by the firewall.

VPN systems require interoperability between user hardware, software, and systems. Often, hardware must be from the same manufacturer or vendor in order to be interoperable. Additionally, the network may not intend that the outside user has access to all of the data in the network. However, bypassing the firewall may give the outside user access to the entire network. The VPN may not be able to limit the amount of data that an outside user can access.

SUMMARY OF THE INVENTION

A method for establishing communication in a network comprises determining communication data from a first network peer at a first tunnel. The communication data is registered with a lookup service. A communication request is received from a second network peer at the lookup service. The communication data of the first peer is provided to the second peer.

In another embodiment, a lookup service in a network comprises a first tunnel module that acquires communication data of a network peer. A registration table stores the communication data. A second tunnel module sends a communication request to the registration table, acquires the communication data from the registration table, and sends a communication attempt to the first tunnel based on the communication data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
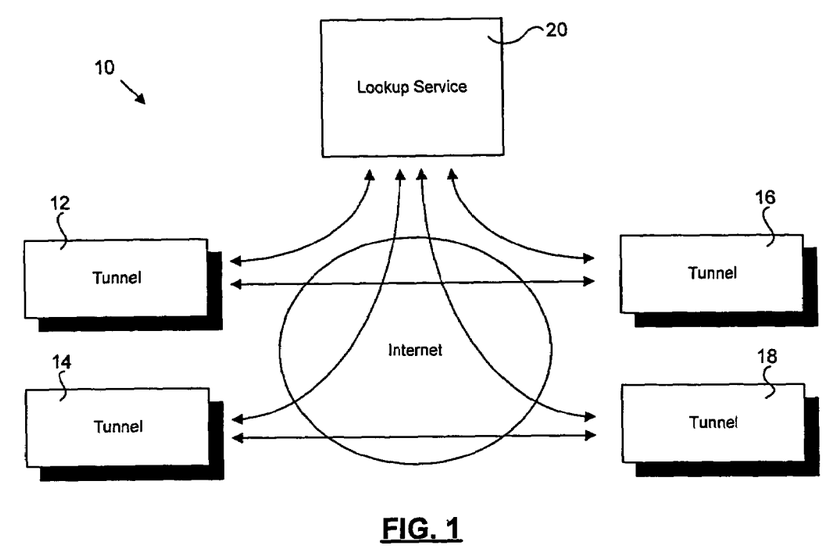
FIG. 1 is a functional block diagram of a protocol selection system according to the present invention.

A protocol selection system 10 dynamically selects a secure communication protocol as shown in FIG. 1. Tunnel systems 12, 14, 16, and 18 detect firewall restrictions of a network or client and determine appropriate tunnel mechanisms for communication. For example, the tunnel mechanism may be bidirectional. A bidirectional tunnel mechanism allows a client to communicate directly with another client. Another tunnel mechanism allows multiple clients to communicate through middleware. The middleware interacts with the tunnel systems and translates communication between the tunnel systems. For example, the middleware may be an intermediate server or other suitable application. In other words, the middleware acts as an intermediary between the tunnel systems, and therefore the clients. The tunnel systems 12, 14, 16, and 18 register communication information, including the firewall restrictions and the tunnel mechanisms, with a lookup service 20. The lookup service 20 may also determine which tunnel mechanism or which middleware to use according to the tunnel systems involved with a particular message or communication request.

Figure 2:
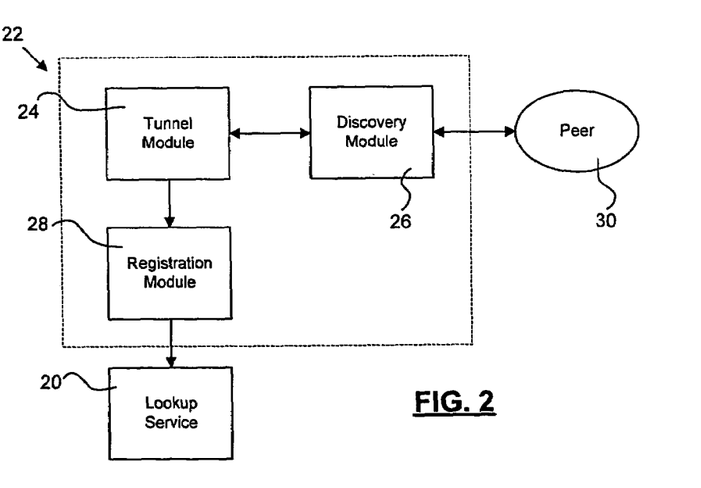
FIG. 2 is a functional block diagram of architecture of a tunnel system according to the present invention.

A tunnel system architecture 22 includes a tunnel module 24, a discovery module 26, and a registration module 28 as shown in FIG. 2. The tunnel module 24 queries the discovery module 26 to determine communication information, including a communication address and tunnel communication capability of a client or network peer 30. The tunnel module 24 forwards the communication information to the registration module 28. The registration module 28 registers the communication information with the lookup service 20. The lookup service 20 includes a table of the communication information for each authorized peer in the system. When a peer makes a request to open communication, the lookup service 20 is responsible for providing the necessary communication addresses and protocol information to enable communication.

Figure 3:
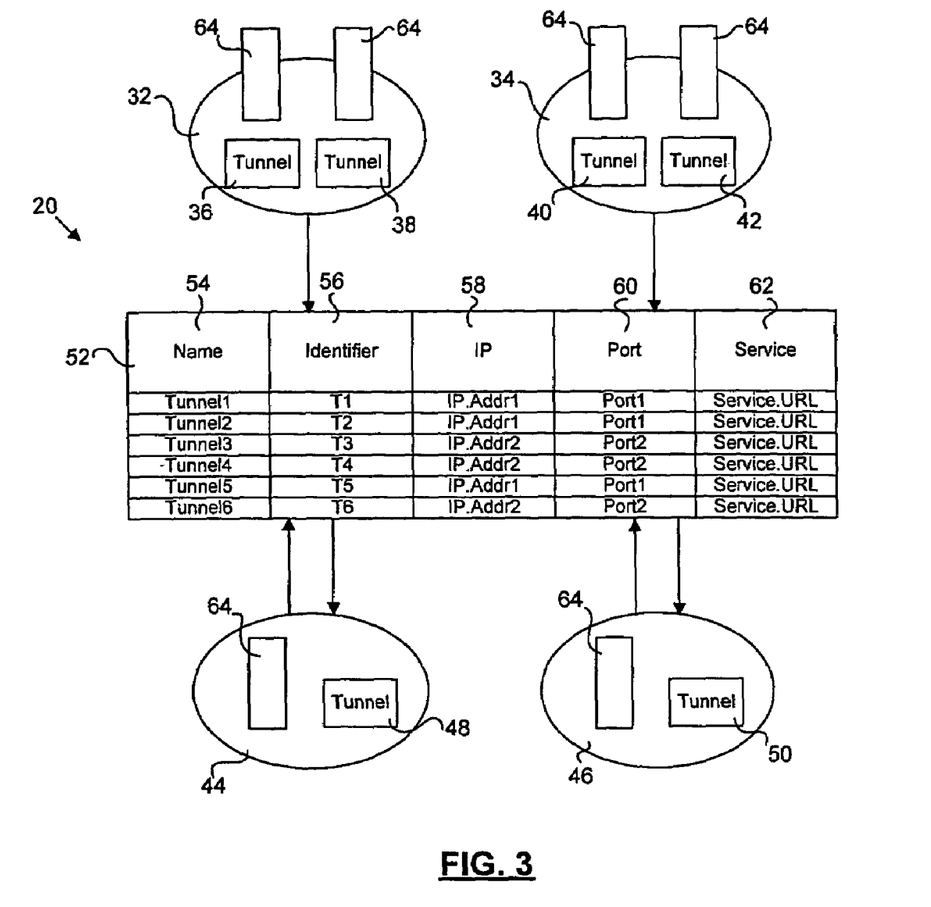
FIG. 3 illustrates a lookup service according to the present invention.

The lookup service 20 manages the communication information as shown in FIG. 3. A tunnel must register its communication information before attempting to communicate with another tunnel. For example, peers 32 and 34 may be able to send and receive messages requests from behind a firewall. The peers 32 and 34 include tunnels 36, 38, 40, 42. The tunnels 36, 38, 40, 42 acquire logic names, such as a uniform resource identifier (URI), from a local resource. The local resource may be the discovery module 26 (as shown in FIG. 2). The tunnels 36, 38, 40, 42 generate a global unique identifier from the URI. The tunnels 36, 38, 40, 42 register the logic names, unique identifiers, and communication addresses with the lookup service 20.

Conversely, peers 44 and 46 may only be able to send messages. The peers 44 and 46 include tunnels 48, 50. The tunnels 48, 50 acquire logic names and generate global unique identifiers. The tunnels 48, 50 register the logic names and unique identifiers with the lookup service 20.

Still referring to FIG. 3, the lookup service 20 maintains a lookup table 52 that includes the registered information such as logic name 54, unique identifier 56, communication address (IP address) 58, port 60, and service capability link 62. The service capability links 62 store the links which are pointed to the location of a service capability descriptor. The service capability descriptor indicates the proxy capability. In other words, the service capability descriptor indicates whether the tunnel systems in peers 32 and 34 have the capability to act as a middleware server to maintain proxy queues for the tunnels 48 and 50. Additionally, the service capability descriptor may indicate proxy queue size, type of data that can be tunneled, security information, tunnel protocol type (TCP, UDP, RTP, etc), and address mapping information.

A tunnel with a communication address may accept incoming connection requests. Alternatively, a tunnel without a communication address does not have the capability to accept incoming connection requests. Often, a tunnel without a communication address is behind a firewall that blocks all incoming connection requests. Therefore, proxy queues are often used within the tunnels with communication addresses to compensate for the tunnels without communication addresses. For example, tunnels 48, 50, which are only able to send messages, do not have their own communication addresses. Any messages sent to the tunnels 48, 50 are instead stored in proxy queues. The lookup service 20 searches the registration table 52 to determine which tunnel systems include proxy queue capabilities. The lookup service 20 assigns the communication address of the proxy queue-capable tunnels to the tunnels that do not have communication addresses. For example, the lookup service 20 may assign the communication address of the tunnel 36 to the tunnel 48. The tunnel 48 polls the proxy queue in the peer 32 to retrieve the messages intended for the tunnel 48. In this manner, proxy queues may be located locally or remotely with respect to each tunnel. In one embodiment, proxy queues may be located on a server with the lookup service. In another embodiment, proxy queues may be located on a dedicated proxy queue server.

Additionally, remote proxy queues may be created dynamically as requested by a peer. For example, before participating in communication, a peer determines whether it will need a remote proxy queue. The peer updates the lookup table 52 with information regarding the remote proxy queue, such as identity of the peer that requires the proxy queue.

The tunnels 36, 38, 40, 42 include a cache 64. Likewise, the tunnels 48, 50 include the cache 64. The cache 64 contains the data from the registration table 52. The tunnel module 24 (as shown in FIG. 2) manages a queue of communication requests for the corresponding tunnel and the cache of the registration table. In the preferred embodiment, the lookup service 20 and the registration table 52 are implemented on a UDDI (universal description, discovery, and integration) framework. However, other suitable implementations for the lookup service 20 and the registration table 52 may be used.

Figure 4:
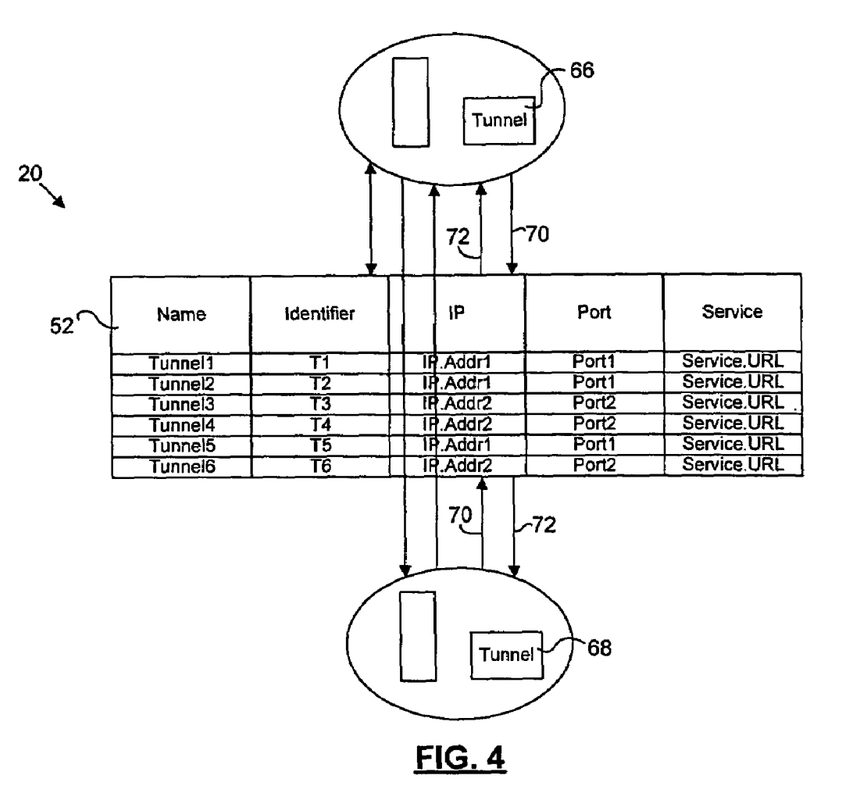
FIG. 4 illustrates the security authentication of a lookup service according to the present invention.

The lookup service 20 may authenticate the registration requests from tunnels 66, 68 as shown in FIG. 4. The tunnels 66, 68 include a certificate 70. The tunnels 66, 68 include the certificate 70 with the registration information sent to the registration table 52. If the lookup service 20 verifies the certificate 70, the lookup service 20 returns a tunnel session identifier 72 to the tunnels 66, 68. The tunnel session identifier 72 may be associated with a time to indicate a lease time for the session. The tunnel module 24 maintains the validity of the tunnel session identifier 72 with the lookup service 20. The lookup service 20 authenticates communication requests from the tunnels 66, 68 based on the tunnel session identifier 72. For example, the tunnel 66 sends a communication request including the tunnel session identifier 72 to the tunnel 68. The tunnel 68 consults the lookup service 20 to verify the tunnel session identifier 72. If the tunnel session identifier 72 is valid, the tunnel 68 creates a proxy queue for the tunnel 66 and communication may begin.

Figure 4A:
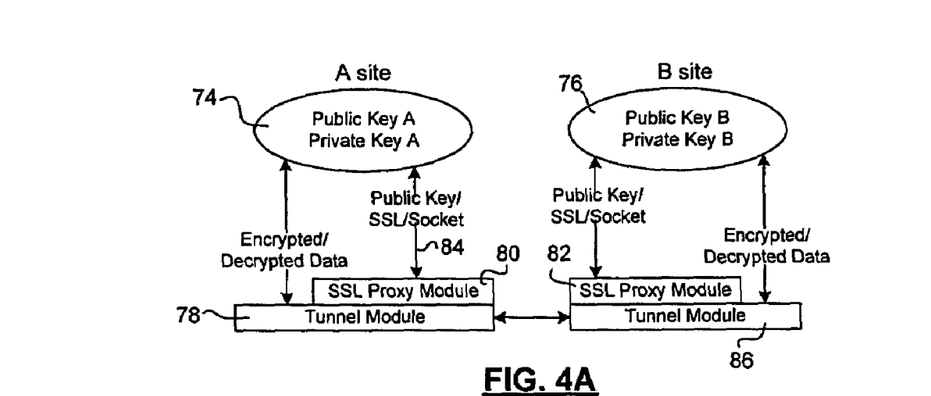
FIG. 4A illustrates encrypted data transmission according to the present invention.

In one embodiment, a first application 74 may intend to send encrypted data to a second application 76 as shown in FIG. 4A. The application 74 must acquire a secured key from the second application 76 for symmetric encryption. Alternatively, the application 74 must acquire a public key for asymmetric encryption. However, if the application 76 is behind a firewall, the application 74 must use a tunnel module 78 to acquire the key. For example, an SSL (secure sockets layer) protocol proxy module 80 of the first application 74 may simulate an SSL proxy module 82 of the second application 76. The first application 74 sends out the public key 84 to the tunnel module 78 through the SSL proxy module 80. The tunnel module 78 sends the key 84 to the tunnel module 86 of the second application 76. The second application 76 can then acquire the key 84 through the SSL proxy module 82. Now, the first application 74 and the second application 76 may communicate through the tunnel modules 78 and 86 without using the SSL proxies.

Referring again to FIG. 4, the lookup table 52 includes alternative communication methods and protocols that a particular tunnel or peer may use. In this manner, peers may select or alternate between communication protocols dynamically. For example, a peer may precede a UDP message with an HTTP header. The peer consults the lookup table 52 to determine the proper protocols for a target peer. The peer uses the information from the lookup table 52 to select the proper tunnel mechanism or protocol for communicating with the target peer. The peer may select a different tunnel mechanism or protocol for communicating with a different target peer.

Figure 5:
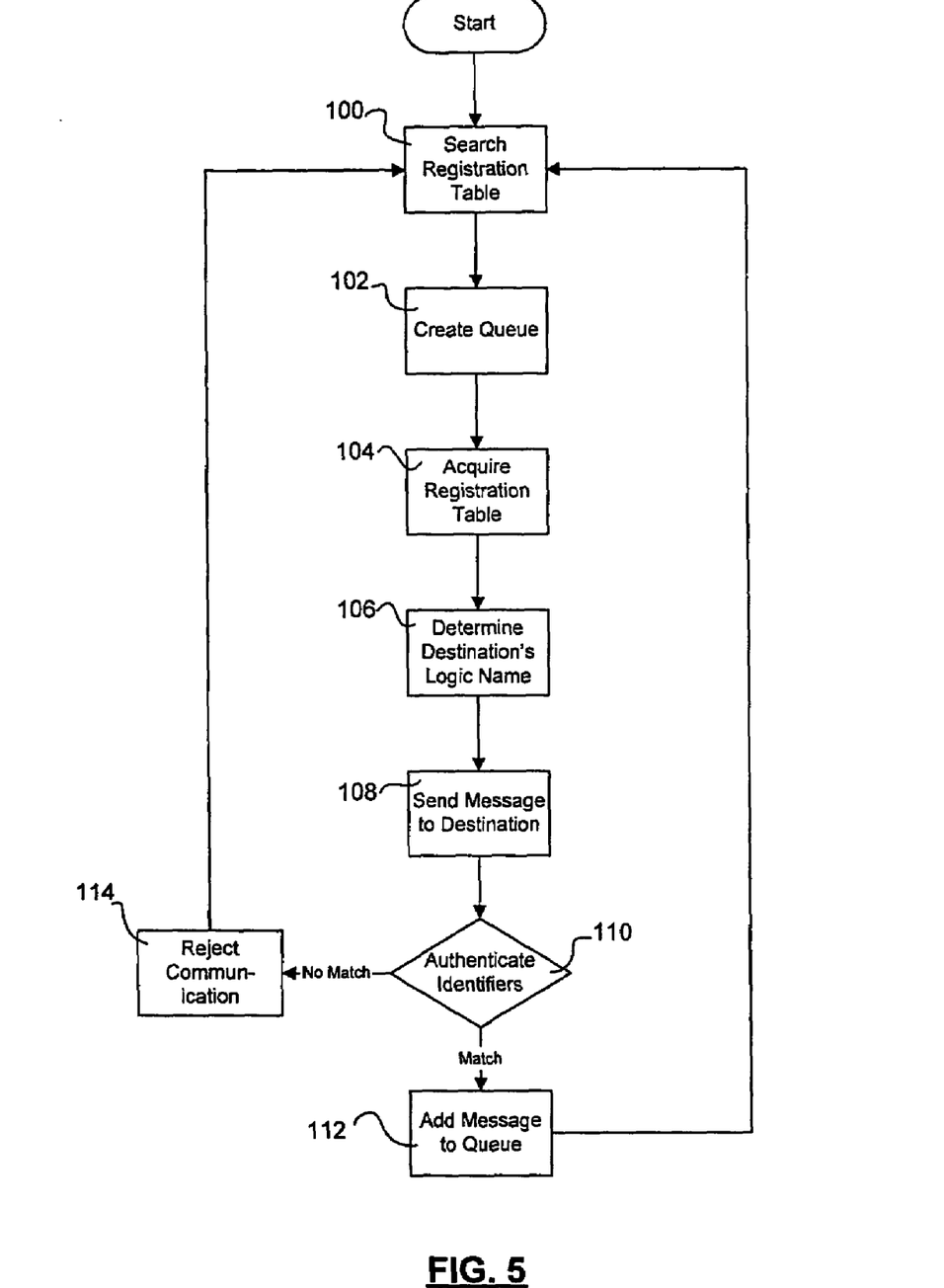
FIG. 5 is a flow diagram of tunnel communication according to the present invention.

A first tunnel initiates communication as shown in FIG. 5. The first tunnel searches the registration table 52 to determine communication address and port information at step 100. The first tunnel creates a receive queue or proxy queue identified by a unique identifier at step 102. The tunnel module 24 acquires the data in the registration table 52 at step 104. The tunnel module 24 periodically updates the cache 64 with the data from the registration table 52. The tunnel module 24 updates the cache 64 by comparing the registration data in the cache 64 with the registration table 52. If the data does not match, the tunnel module 24 refreshes the cache 64.

By consulting the registration data in the cache 64, the tunnel determines the logic name of a second tunnel at step 106. Using the logic name, the tunnel discovers the communication address of the second tunnel from the lookup service 20. The first tunnel sends a message to the second tunnel based on the second tunnel's communication address at step 108. The message includes the second tunnel's unique identifier. When the second tunnel receives the message, the second tunnel checks the unique identifier included with the message against the second tunnel's unique identifier at step 110. If the identifiers match, the second tunnel adds the message to a proxy or receive queue at step 112. If the identifiers do not match, the second tunnel rejects the message at step 114.

Figure 6:
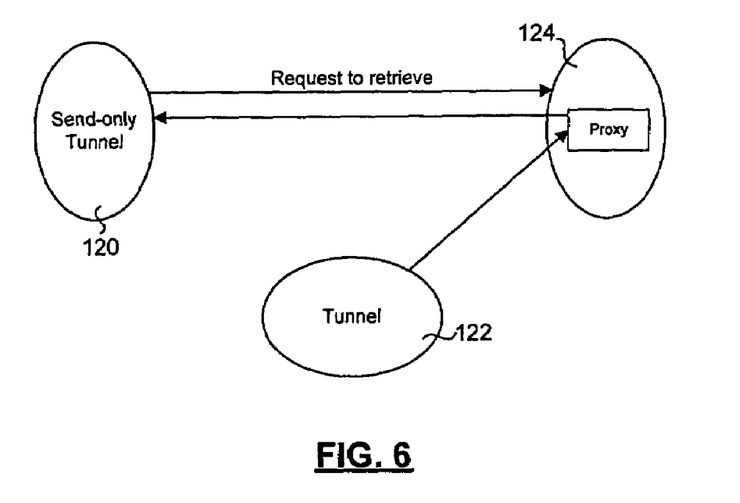
FIG. 6 illustrates message retrieval according to the present invention.

In another embodiment, a send only tunnel 120 may retrieve a message as shown in FIG. 6. Receiving capability of the send only tunnel 120 is limited by a firewall. Tunnel 122 sends a message to the send only tunnel 120. Because the tunnel 120 is send only, the registration table 52 matches the tunnel 120 to the communication address of a send/receive tunnel 124. Therefore, the message from the tunnel 122, intended for the tunnel 120, is sent to the proxy queue of the tunnel 124. The tunnel 120 sends a request to the tunnel 124 to retrieve the message from the proxy queue. If the tunnels 120 and 122 are both send-only, the tunnels 120 and 122 may both retrieve messages from their corresponding proxy queues of the tunnel 124.

Figure 7:
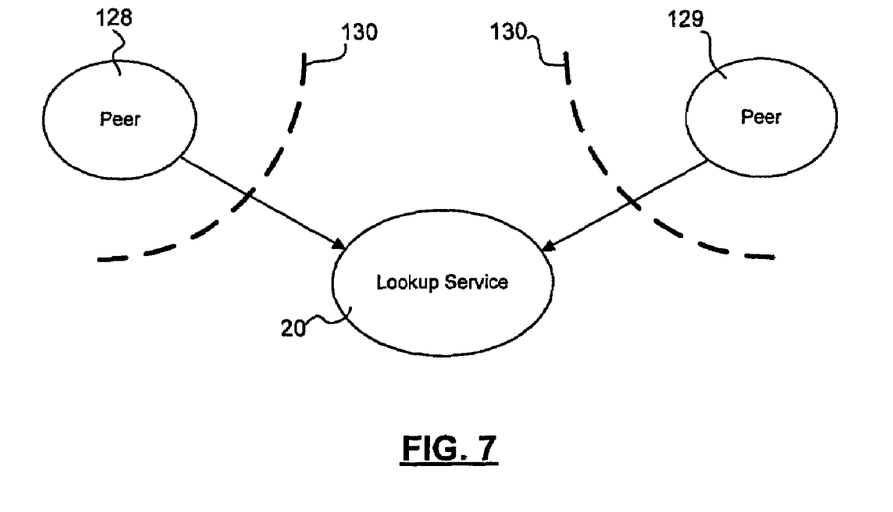
FIG. 7 illustrates TCP discovery according to the present invention.

A discovery procedure for TCP (transmission control protocol) is shown in FIG. 7. If a peer 128 is behind a NAT (network address translation) firewall, port mapping must be established. For example, the NAT 130 may assign a public port number to the peer 128 through UPnP (universal plug and play) protocol. Alternatively, the NAT 130 may assign a public port number to the peer 128 based on a configuration of a router. To establish port mapping through UPnP, the peer 128 sends a request to a UPnP router to map a public port to the service port of the peer 128. Upon receiving the request, the UPnP router allocates a public port to the peer 128.

The NAT 130 assigns the public port number when the peer 128 attempts discovery with the lookup service 20. The peer 128 also receives a URI (uniform resource identifier) from a local resource. The peer 128 registers the URI, the public port number, and a NAT public IP address with the lookup service 20. The lookup service 20 creates a table entry to store the URI, the public port number, and NAT IP address. The peer 128 registers the IP address and the public port. The lookup service 20 correlates the NAT IP address with the public port.

To initiate a communication session with the peer 128, another peer 129 looks up the URI of the peer 128 to determine the public port number and the NAT IP address. The peer 129 uses the public port number and the NAT IP address to initiate communication.

Figure 8:
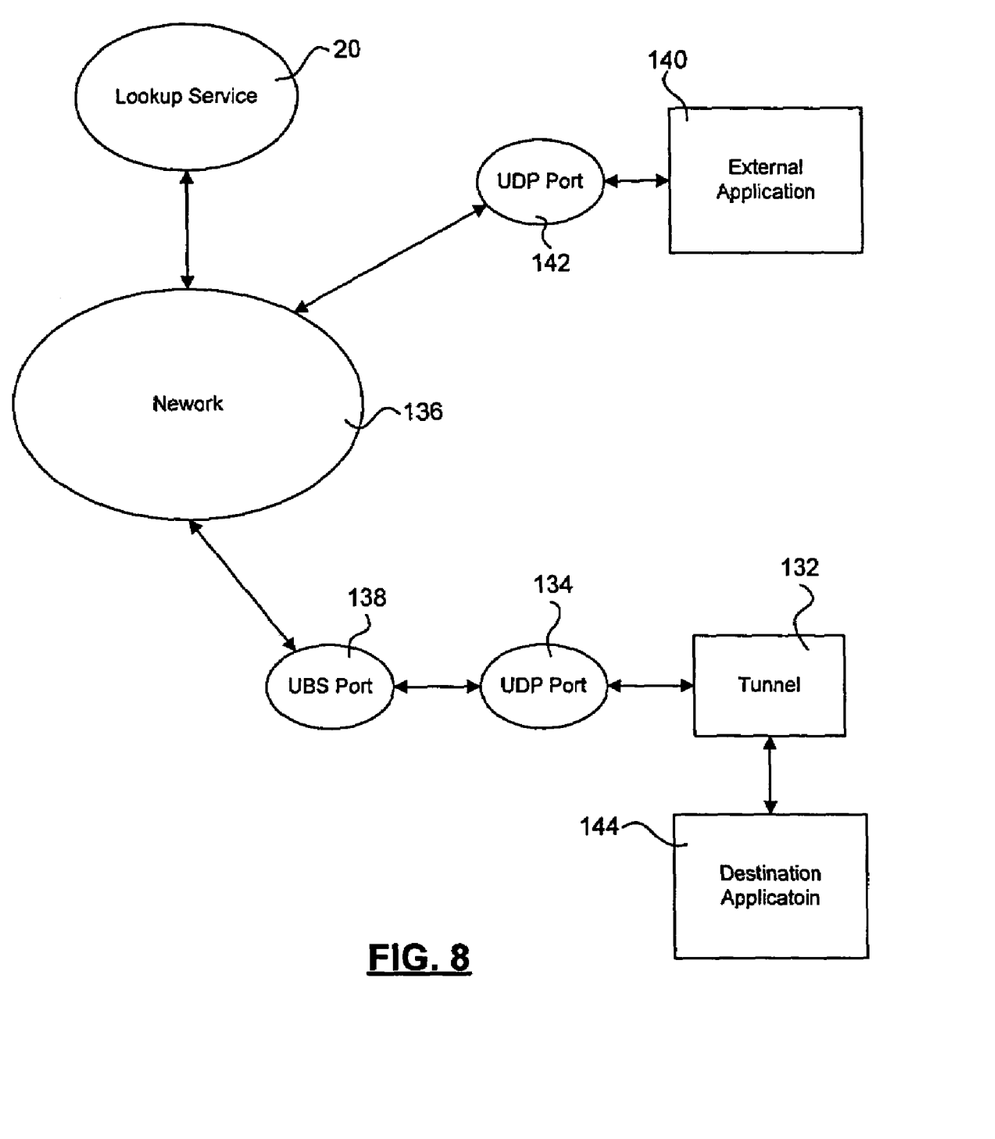
FIG. 8 illustrates UDP discovery according to the present invention.

A discovery procedure for UDP (user datagram protocol) is shown in FIG. 8. A tunnel 132 opens a UDP brokerage service port 134. The UDP port 134 and the IP address of the tunnel 132 are mapped to a corresponding public port and IP address that are accessible to a public network 136. The corresponding public port and IP address are hereinafter referred to as the UBS (UDP brokerage service) port 138. The tunnel 132 may retrieve and maintain the mapping information using UPnP, manual configuration, or other suitable methods.

Still referring to FIG. 8, the tunnel 132 registers the UBS port information with the lookup service 20. An external UDP application 140 interacts with the lookup service 20 to determine the UBS port information. The external application 140 opens its UDP port 142 for communication and sends a UDP connection setup request (UCSR) to the UBS port 138. The tunnel 132 compares and analyzes the origin IP address and port of the UCSR request and forwards the information to a destination application 144. The tunnel 132 may send a UDP connection setup reject message if the request cannot be granted. For example, the tunnel 132 may reject a request if resources are not available or if the external application 140 is not authorized to communicate.

The destination application 144 opens the UDP 134 port after receiving the UCSR origin IP address and port information. The destination application 144 responds through the UDP port 134 with a UDP connection setup confirm (UCSC) message. Alternatively, the destination application 144 may respond with a UDP connection setup rejects message if necessary. The external UDP application 140 analyzes the origin IP address and port information from the UCSC message. In this manner, the external UDP application 140 may point future communication directly to the destination application 144.

The external application 140 sends a UDP connection ready (UCR) message to the destination application 144. The destination application 144 responds with a UCR message. The external application 140 and the destination application 144 may now begin communication. The external application 140 and/or the destination application 144 may maintain a timer. If no accepted messages are received during a period defined by the timer, the applications may discontinue communication.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An application tunneling method for establishing communication between distributed application modules in different private networks without requiring modification and administration of communication protocols of existing security protection network devices, including one or more firewall, network address translation protocol, or proxy servers, comprising:

employing a distributed communication architecture, the architecture including:

(a) at least one tunnel registration and look up service module supporting dynamic registration and access of communication data including one or more of the following types of information: (i) logical name; (ii) unique identifier; (iii) communication address; (iv) port; or (v) a service capability link pointing to a data type descriptor describing one or more of the following types of data: direct or indirect tunneling; security information; tunnel protocol type; or address mapping information for distributed application modules;

(b) at least one tunnel service software module that is independent from the existing security protection network devices to relay communication data for a local application module to an external network;

(c) at least one tunnel session that is independent from the security network protection devices and can be dynamically configured to receive messages from and send messages to different ones of the application modules and a tunnel module co-located with a session control module; and (d) at least one tunnel message switching service supporting indirect tunneling specified in capability descriptors of tunnel sessions established between two or more remote tunnel services behind private networks;

wherein employing the distributed communication architecture results in multiple application tunnel networks over multiple private networks that have the following properties:

(a) without requiring design or configuration changes of the existing security protection network devices, the tunnel networks only require that one or more of the private networks allow for outgoing web access to one or more commonly accessible and secure web servers using a most common HTTP protocol;

(b) the tunnel networks allow dynamic selection of additional tunneling methods based on allowable inbound and outbound filtering policies of the private networks; and (c) the tunnel networks only feed application communication module IP address, port number, and application data to tunnel service servers, thereby rendering a tunneling operation of an application independent and protected from administration of existing private networks.

2. The method of claim 1 wherein:

the communication data further comprises at least one of firewall restrictions, a tunnel protocol, or port mapping information obtained by a discovery module which observes the firewall restriction, interacts with an external UDP brokerage service (UBS) to allocate a port in a Network Address Translator (NAT) by sending a message to the UBS through the NAT, discovers the port mapping from the NAT through UPnP protocol and register the mapping to Look-up service;

a registration service in a public network accepts registration requests from at least one tunneling service in a private/secured network, which is connected to the public network via a firewall or network address translating device, the registration service authenticating the registering tunneling service, using certificates for processing the registration requests, and issuing registration responses to the requests;

a lookup service accepts lookup requests from at least one tunneling service in the private/secured network, and sends lookup results in response to the requests.

3. The method of claim 1 further comprising authenticating the communication request at a lookup service independently from private and secure network devices for at least two tunnel services to establish a secure tunnel session so that multiple communication peers can use one or more secure tunnel sessions to exchange messages through an external tunnel switching service or directly send messages to one or more ports specified in a look-up service to achieve secure tunneling of application data with dynamic selection of a tunnel switching service for indirect communication, or without tunnel switching services for direct communication to the tunnel service independent from the existing network devices.

4. The method of claim 3 wherein the communication request includes a certificate indicative of a network peer to allow a tunnel switching server to authenticate a message sent from a sender independently from any existing private security network devices.

5. The method of claim 4 wherein authenticating the communication request includes providing a tunnel identifier to the network peer in response to a certificate, wherein the tunnel identifier is used by the tunnel switching service to associate with a message queue and communication data specified in look-up services.

6. The method of claim 5 wherein the architecture further includes a tunnel module requesting an external tunnel switching server to create a message queue with associated session ID and certificate for one of the network peers to allows for another of the network peers to authenticate and send messages through the tunnel module to the message queue in an external tunnel switching service server in a dynamic fashion.

7. The method of claim 6 further comprising adding the communication request to the message queue.

8. The method of claim 7 wherein the message queue is a proxy queue that is created by the tunnel switching service for one remote tunnel service to receive messages from another remote tunnel service asynchronously.

9. The method of claim 7 wherein creating the message queue includes creating the message queue at a server remotely located from the first network peer.

10. The method of claim 7 wherein creating the message queue includes creating the message queue in a tunnel switching service based on data specified in the lookup service, the tunnel services send and receive messages to and from message queues through the tunnel switching service using HTTP, SOAP or a proprietary message protocol based on a local private network security policy and firewall restrictions, and size of the messages can be reduced to support real-time traffic or increased to support large batched traffic.

11. The method of claim 7 further comprising tracking the location of the message queue at the lookup service so that tunnel services can use more than one message queues to receive messages to support high performance and reliability.

12. The method of claim 2, further comprising dynamically registering and selecting a tunnel protocol in a network, including:

employing a tunneling service in a private/secured network to accept data from at least one application in its local network, and forward data accepted from local applications to a tunnel switching service in an external public network through a firewall or network address translating router that connects the external public network and the private/secured network, wherein a tunneling service in the private/secured network accepts data from the tunnel switching service in a public network via a local firewall or network address translating router, forwards the data to at least one application in its local network, and, based on content specified in the look-up service, allows two or more of the following alternatives to be selected dynamically:

(a) using HTTP to get a message from the tunnel switching server;

(b) receiving data directly from the UDP ports that is used to sent out UDP set up packet through interaction with UBS;

(c) using TOP to send and receive data;

(d) using UDP for sending and HTTP for receiving messages from a message queue in a tunnel switch;
(e) using encryption for IP address and port;
(f) using encryption for data;
(g) using new communication protocols as supported by private networks on an individual basis; or
(h) combinations of the above as supported by private networks on an individual basis.

13. A lookup service in a network comprising:
a first tunnel service module that acquires communication data of an associated network peer that is connected to a first network, wherein the first tunnel service module facilitates communication between the network peer and an internetwork;
a registration table that stores the communication data and that is accessible via the internetwork; and
a second tunnel service module that sends a communication request to the registration table, acquires the communication data from the registration table, and sends a communication attempt to the first tunnel based on the communication data,
wherein said look-up service does not limit a number of entries for each communication session between two tunnel services, thereby allowing applications to group multiple message queues to create parallel communication channels between a pair of tunnel services.

14. The lookup service according to claim 13 further comprising a discovery module that acquires the communication data at least one of during start up of the tunnel service or based on predetermined conditions resulting in or resulting from a change of the communication data.

15. The lookup service according to claim 13 further comprising a registration module that registers the communication data with the registration table.

16. The lookup service according to claim 13 wherein the communication data includes at least one of a logic name, a unique identifier, a communication address, a port, a communication protocol, and service capabilities.

17. The lookup service according to claim 13 wherein the communication request includes a certificate indicative of the second tunnel module.

18. The lookup service according to claim 17 wherein the registration table sends a tunnel identifier to the second tunnel in response to the certificate.

19. The lookup service according to claim 18 wherein the communication attempts includes the tunnel identifier.

20. The lookup service according to claim 19 wherein the first tunnel verifies the tunnel identifier with the registration table and accepts the communication attempt.

21. The lookup service according to claim 13 wherein the first and second tunnels include a cache to store communication data to support fast access needed for dynamic selection of direct and indirect tunneling with different protocols.

22. The lookup service according to claim 21 wherein the cache stores the communication data.

23. The lookup service according to claim 22 wherein the cache retrieves the communication data from the registration table.

24. The lookup service according to claim 13 further comprising a message queue.

25. A method for establishing communications between applications in different secured or private networks comprising:
employing an application independent (web-based) tunneling service in each of the private networks, which are connected to a public network through firewall or network address translating routers;
employing a tunnel registration and lookup service in the public network;
employing a tunnel switching service in the public network; and
tunneling different application data from a first private/secured network to at least one second private/secured network,
wherein tunneling different application data from the first private/secured network to the at least one second private/secured network includes employing a first tunneling service in the first private/secured network forwarding data accepted from local applications to at least one second tunneling service in the second private/secured network via a first local firewall/network address translating router, the tunnel switching service in the public network to which the first local router is connected, and a second firewall/network address translating router that connects the public network to the at least one second private/secured network.

26. The method of claim 25, wherein tunneling different application data from the first private/secured network to the at least one second private/secured network includes employing a tunneling service in a private/secured network accepting data from at least one application in its local network.

27. The method of claim 25, wherein tunneling different application data from the first private/secured network to the at least one second private/secured network includes employing a tunneling service in the first private/secured network forwarding data accepted from local applications to the tunnel switching service in the external public network through a firewall or network address translating router that connects the external public network and the private/secured network.

28. The method of claim 25, wherein tunneling different application data from the first private/secured network to the at least one second private/secured network includes employing a first tunneling service in the first private/secured network forwarding data accepted from local applications to at least one second tunneling service in the second private/secured network via its local firewall/network address translating router, the public network to which the local router is connected, and a firewall/network address translating router that connects the public network to the second private/secured network.

29. The method of claim 25, wherein tunneling different application data from the first private/secured network to the at least one second private/secured network includes employing a tunneling service in the second private/secured network accepting data from the tunnel switching service in the public network via a local firewall or network address translating router.

30. The method of claim 25, wherein tunneling different application data from the first private/secured network to the at least one second private/secured network includes employing a first tunneling service in the first private/secured network accepting data from a second tunneling service in the at least one second private/secured network via a firewall/network address translating router of the at least one second private/secured network, the tunnel switching service in the public network, and a firewall/network address translating router of the first private/secured network.

31. The method of claim 25, wherein tunneling different application data from the first private/secured network to the at least one second private/secured network includes employing a first tunneling service in the first private/secured network accepting data from at least one second tunneling service in the at least one second private/secured network, via a firewall/network address translating router of the at least one second private/secured network, the public network connecting the private networks, and a firewall/network address translating router of the first private/secured network.

32. The method of claim 25, wherein tunneling different application data from the first private/secured network to the at least one second private/secured network includes employing a tunneling service in the at least one second private/secured network forwarding data that is accepted from the tunneling switching service in the public network to at least one application in its local network.

33. The method of claim 25, wherein tunneling different application data from the first private/secured network to the at least one second private/secured network includes employing a first tunneling service in the first private/secured network forwarding to at least one application in its local network data that is accepted from a second tunneling service in the at least one second private/secured network, via a firewall/network address translating router of the at least one second private/secured network, the tunnel switching service in the public network, and a firewall/network address translating router of the first private/secured network.

34. The method of claim 25, wherein tunneling different application data from the first private/secured network to the at least one second private/secured network includes employing a first tunneling service in a first private/secured network forwarding to at least one application in its local network data that is accepted from a second tunneling service in the at least one second private/secured network, via a firewall/network address translating router of the at least one second private/secured network, and the firewall/network address translating router of the first private/secured network.

35. The method of claim 25, wherein tunneling different application data from the first private/secured network to the at least one second private/secured network includes employing a technique wherein at least one tunnel service in one of the private/secured networks, registers itself to a registration service in a public network, which is connected to the private/secured network by a firewall/network address translating device/router.

36. The method of claim 25, wherein tunneling different application data from the first private/secured network to the at least one second private/secured network includes employing a technique wherein at least one tunnel service in one of the private/secured networks registers at least one tunnel to a registration service in the public network, which is connected to the private/secured network by a firewall/network address translating device/router.

37. The method of claim 25, wherein tunneling different application data from the first private/secured network to the at least one second private/secured network includes employing a technique wherein a first tunnel service in the first private/secured network accesses a registration service, which is connected to the first private/secured network by a firewall/network address translating device/router and the at least one second private/secured network by a firewall/network address translating device/router, to look up for a second tunnel service in the at least one second private/secured network.

38. A method for establishing communications between applications in different secured or private networks comprising:
employing an application independent (web-based) tunneling service in each of the private networks, which are connected to a public network through firewall or network address translating routers;
employing a tunnel registration and lookup service in the public network;
employing a tunnel switching service in the public network; and
tunneling different application data from a first private/secured network to at least one second private/secured network,
wherein tunneling different application data from the first private/secured network to the at least one second private/secured network includes employing a technique wherein a first tunnel service in the first private/secured network accesses a registration service, which is connected to the first private/secured network by a firewall/network address translating device/router and at least one second private/secured network by a firewall/network address translating device/router, to look up for a tunnel provided by a second tunnel service in the second private/secured network.

39. The method of claim 38, wherein employing the technique to switch tunnels between different private/secured networks includes employing a lookup table in the tunnel switching service in the public network that maps at least one tunnel from at least one tunneling service in at least one private/secured network, which is connected to the public network via a firewall/network address translating device/router.

40. The method of claim 38, wherein employing the technique to switch tunnels between different private/secured networks includes employing the tunnel switching service that accepts data from at least one tunnel service in at least one of the private/secured networks, which is connected to the public network via a firewall/network address translating device/router.

41. The method of claim 38, wherein employing the technique to switch tunnels between different private/secured networks includes employing the tunnel switching service that looks up in a lookup table for a destination tunnel service for data accepted from east one tunnel service in at least one of the private/secured networks, which is connected to the public network via a firewall/network address translating device/router.

42. The method of claim 41, wherein employing the technique to switch tunnels between different private/secured networks includes employing a tunnel switching service that forwards data accepted from at least one first tunnel service in at least one first private/secured network, which is connected to the public network via a firewall/network address translating device/router, to at least one second tunnel service in at least one second private/secured network, which is connected to the public network via a firewall/network address translating device/router, according to the results of lookup.

* * * * *